United States Patent
Fuhrman et al.

(10) Patent No.: US 8,621,463 B2
(45) Date of Patent: Dec. 31, 2013

(54) DISTRIBUTED COMPUTING ARCHITECTURE WITH DYNAMICALLY RECONFIGURABLE HYPERVISOR NODES

(75) Inventors: Thomas E. Fuhrman, Shelby Township, MI (US); Sandeep Menon, Rochester Hills, MI (US); Lawrence E. Peruski, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 32 days.

(21) Appl. No.: 13/228,510

(22) Filed: Sep. 9, 2011

(65) Prior Publication Data
US 2013/0067465 A1    Mar. 14, 2013

(51) Int. Cl.
*G06F 9/455* (2006.01)
(52) U.S. Cl.
USPC .............................................. 718/1
(58) Field of Classification Search
None
See application file for complete search history.

(56) References Cited

U.S. PATENT DOCUMENTS

| | | | |
|---|---|---|---|
| 5,253,344 A | 10/1993 | Bostick et al. | |
| 8,234,469 B2* | 7/2012 | Ranade | 711/162 |
| 2003/0217088 A1* | 11/2003 | Takamoto | 709/1 |
| 2008/0189700 A1* | 8/2008 | Schmidt et al. | 718/1 |
| 2011/0126186 A1* | 5/2011 | Srinivasan | 717/171 |
| 2012/0036418 A1* | 2/2012 | Morino et al. | 714/807 |
| 2012/0137098 A1* | 5/2012 | Wang et al. | 711/165 |
| 2012/0297236 A1* | 11/2012 | Ziskind et al. | 714/3 |

* cited by examiner

*Primary Examiner* — Gregory A Kessler
(74) *Attorney, Agent, or Firm* — Quinn Law Group, PLLC

(57) ABSTRACT

A method of dynamically reconfiguring a distributed computing architecture having a plurality of processing nodes, where each processing node hosts a respective plurality of virtual machines, includes detecting a fault condition on a first processing node, assessing the criticality of a software function performed by each of the respective virtual machines on the first processing node, and reassigning at least one of the plurality of virtual machines on the first processing node to a second processing node if the at least one virtual machine is deemed critical.

15 Claims, 3 Drawing Sheets

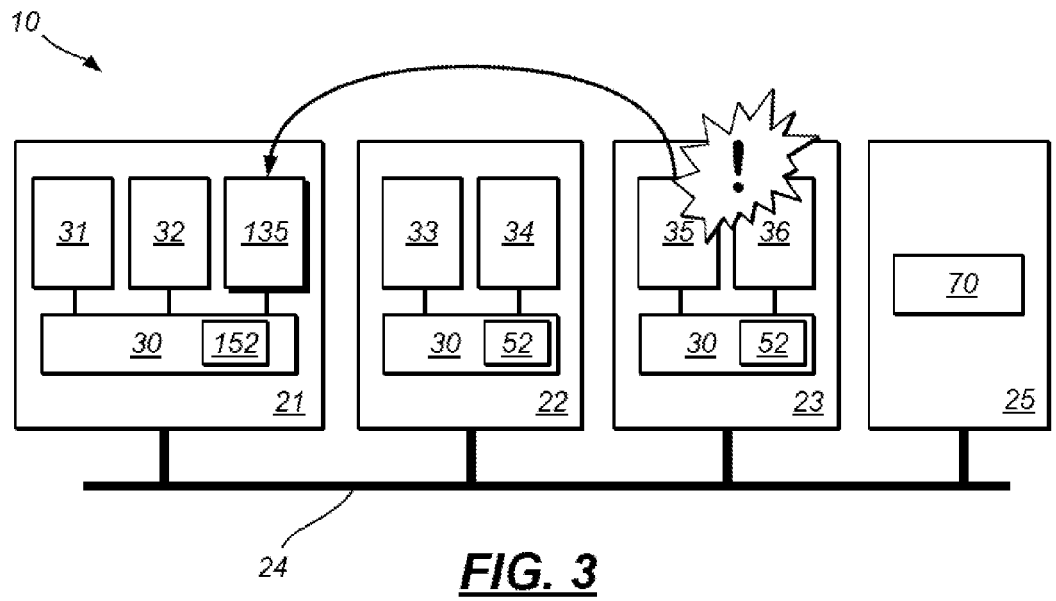
FIG. 3
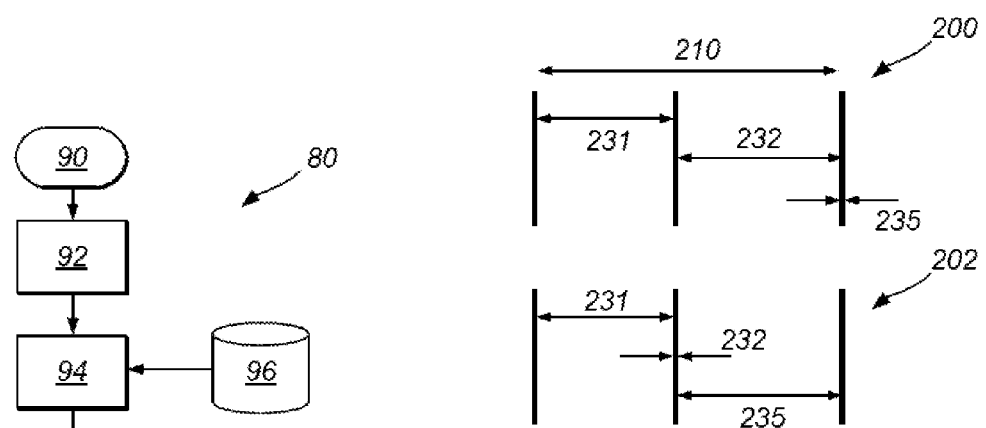
FIG. 4
FIG. 5
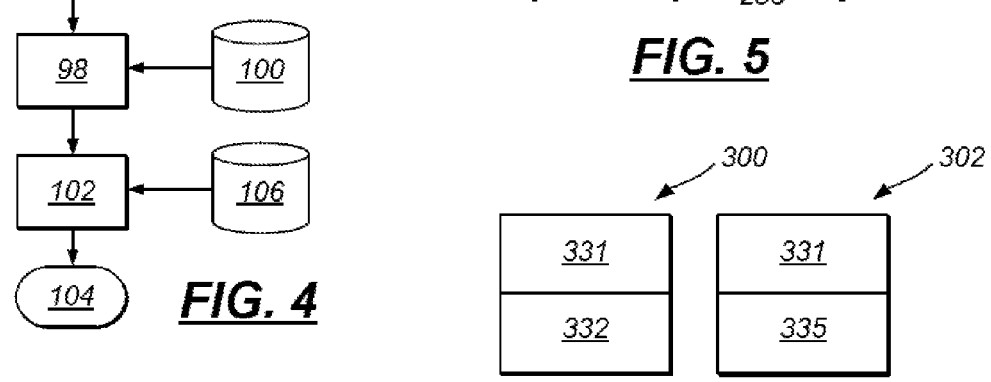
FIG. 6

DISTRIBUTED COMPUTING ARCHITECTURE WITH DYNAMICALLY RECONFIGURABLE HYPERVISOR NODES

TECHNICAL FIELD

The present invention relates generally to a distributed computing architecture that includes dynamically reconfigurable hypervisor nodes.

BACKGROUND

Software-based electronic control systems are increasingly being used in the automobile industry to control active safety and autonomous driving features that impact the motion and dynamic stability of the vehicle. As the levels of control intelligence, automated decision making, and control authority over actuators implemented in software continues to increase, these control systems become more and more critical. The software, hardware, and system architectures of these control systems must therefore be fault-tolerant, and in some cases, even fail-operational. This requires that redundant software, computing hardware, sensors, actuators, and network communication components must be designed into the system so that if one component fails, another component is available to continue to provide a safe level of functionality, whether in a full-performance mode or in a degraded-performance mode.

Redundant hardware components must be statically designed into the system, because one cannot easily add new hardware (sensors, actuators, computers, communication links, wiring harnesses) into a vehicle that is in the middle of a driving cycle. For this reason, the various control systems of the vehicle may be distributed across a plurality of hardware devices, where a single hardware failure may not cripple the entire vehicle operation. Redundant software components, on the other hand, may be either statically or dynamically allocated into the system.

SUMMARY

A method of dynamically reconfiguring a distributed computing architecture having a plurality of processing nodes, where each processing node hosts a respective plurality of virtual machines, includes detecting a fault condition on a first processing node, assessing the criticality of a software function performed by each of the respective virtual machines on the first processing node, and reassigning at least one of the plurality of virtual machines on the first processing node to a second processing node if the at least one virtual machine is assessed as being above a threshold level of criticality. Each of the plurality of processing nodes may be distinct computing devices, with each computing device including physical computing hardware and software.

Reassigning the at least one virtual machine may include generating a hypervisor configuration file and transmitting the hypervisor configuration file to the second processing node. The hypervisor configuration file may direct a hypervisor on the second processing node to apportion use of physical computing hardware to the at least one reassigned virtual machine. The physical computing hardware may include, for example, a digital processing device and volatile and/or non volatile memory, as well as analog and/or digital input/output (I/O) circuitry, and/or network communication circuitry. Additionally, the hypervisor configuration file may direct the hypervisor on the second processing node to reduce an apportionment of physical computing hardware to at least one of the plurality of virtual machines.

In one configuration, the use of the physical computing hardware may be apportioned according to a time-division scheme, a priority-scheme, or a fixed mapping scheme. The criticality of a software function may be assessed by categorizing the software functions according to automotive software integrity levels, such as those specified in ISO 26262-9:2011.

Additionally a distributed computing architecture with dynamically reconfigurable processing nodes may include a supervisor node, including physical computing hardware and executable software, and a first processing node and second processing node in communication with the supervisor node over a data network. Each of the first and second processing nodes may respectively include physical computing hardware, a hypervisor, and a plurality of virtual machines. The hypervisor may be configured to apportion use of the physical computing hardware to the plurality of virtual machines. Additionally, a reconfiguration manager may operate on the supervisor node.

The reconfiguration manager may be configured to detect a fault condition on the first processing node, assess the criticality of a software function performed by each of the respective virtual machines on the first processing node, and reassign at least one of the plurality of virtual machines on the first processing node to the second processing node if the at least one virtual machine is assessed as being above a threshold level of criticality.

In one configuration the reconfiguration manager is further configured to provide a hypervisor configuration file to the second processing node, which may direct the hypervisor on the second processing node to apportion use of the physical computing hardware to the at least one reassigned virtual machine. Additionally, the hypervisor configuration file may direct the hypervisor on the second processing node to reduce an apportionment of the physical computing hardware to at least one of the plurality of virtual machines.

The physical computing hardware may be apportioned to the plurality of virtual machines on a processing node according to a time-division scheme, a priority-scheme, or a fixed mapping scheme. Furthermore, the reconfiguration manager may be configured to assess the criticality of a software function by categorizing the software functions according to automotive software integrity levels specified in ISO 26262-9:2011.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic illustration of the distributed computing architecture of FIG. 1, with a virtual machine being reassigned from a faulty computing device to a functioning computing device.

FIG. 4 is a flow diagram of a method for dynamically reconfiguring a distributed computing architecture having a plurality of processing nodes.

FIG. 5 is a processor allocation diagram illustrating a processor allocation before and after a reconfiguration.

FIG. 6 is a memory map illustrating a memory resource allocation before and after a reconfiguration.

DETAILED DESCRIPTION

Figure 1:
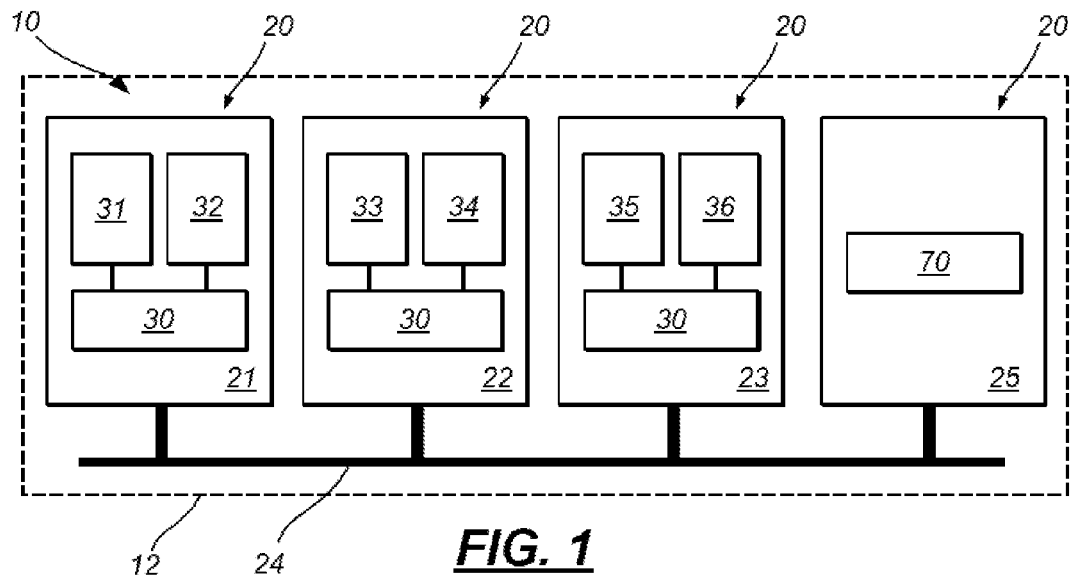
FIG. 1 is a schematic illustration of a distributed computing architecture that includes a plurality of distinct computing devices.

Referring to the drawings, wherein like reference numerals are used to identify like or identical components in the various views, FIG. 1 schematically illustrates a distributed computing architecture 10 that includes a plurality of distinct computing devices 20 in communication over a data network 24. As will be discussed below, each computing device 20 may include computing hardware and executable software and/or firmware (herein referred to only as "software") that may allow the device to perform one or more particular tasks. The architecture 10 may be suited to control or interface with a broader system 12, such as an automobile, where there are many distinct sub-systems, each subject to electronic control or monitoring.

Within the architecture 10, a plurality of the computing devices 20 may be configured as processing nodes 21, 22, 23, and at least one computing device 20 may be configured to operate as a supervisor node 25. In general, a processing node may include application software that is configured to interface with the broader system and perform one or more control or monitoring functions and/or diagnostic routines. Conversely, a supervisor node may oversee and/or manage the performance, behavior, or execution of the control/monitoring routines resident on the various processing nodes. Additionally, the supervisor node may detect unexpected behaviors or faults in the processing nodes, may allocate or reallocate resources among the processing nodes 21, 22, 23, and/or may orchestrate or supervise communications across the network 24.

Each processing node 21, 22, 23 may host one or more virtual machines that may be used to isolate the various control/monitoring routines from each other (i.e., each virtual machine may be configured to perform one or more related routines). As used herein, a virtual machine is a software implementation of a computing machine (i.e. a computer) that executes programs or control algorithms much like a stand-alone physical machine. For example, processing node 21 may host virtual machines 31 and 32, processing node 22 may host virtual machines 33 and 34, and processing node 23 may host virtual machines 35 and 36. Each node 21, 22, 23 may include a respective hypervisor 30, or virtual machine manager, that may apportion the underlying physical machine resources between the virtual machines according to a predefined plan or schedule. This type of virtualization is often referred to as hardware virtualization, as the hypervisor 30 runs between the physical hardware and the operating environment of the virtual machine.

Figure 2:
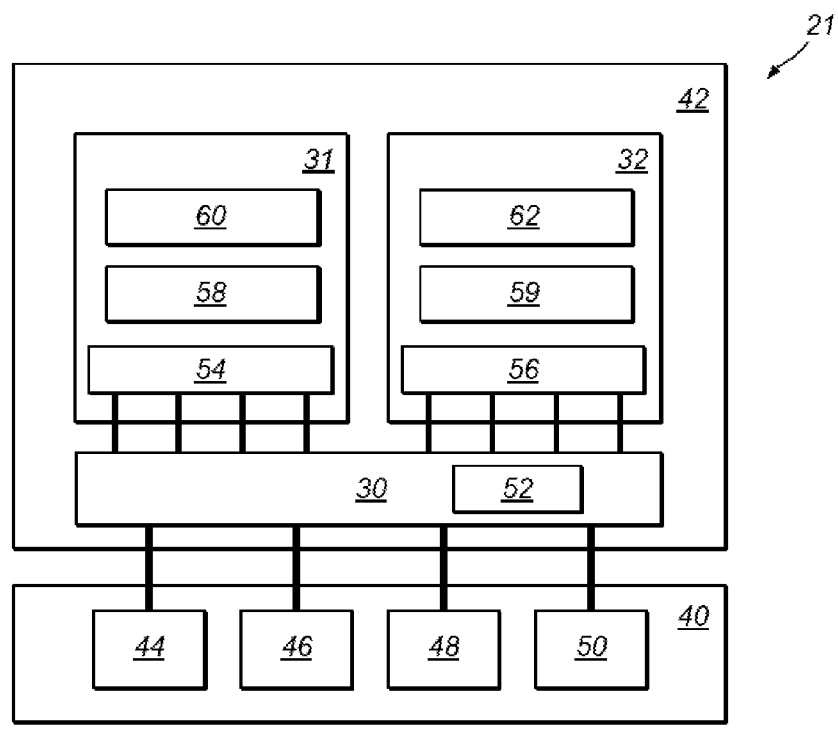
FIG. 2 is a schematic illustration of a processing node including a plurality of virtual machines.

FIG. 2 further illustrates the structure of a processing node 21. As shown, the processing node 21 may be embodied as a combination of computing hardware 40 and software 42. The computing hardware 40 may include various hardware resources, such as one or more digital processing devices 44, volatile and/or non-volatile memory 46, analog and/or digital input/output (I/O) circuitry 48, and/or network communication circuitry 50. For example, the one or more digital processing devices 44 may each include one or more microprocessors, central processing units (CPUs) or digital signal processors (DSPs), or other integrated processing devices; the memory 46 may include read only memory (ROM), random access memory (RAM), flash memory, and/or electrically-erasable programmable read only memory (EEPROM); the I/O circuitry 48 may include a high-speed clock, analog-to-digital (A/D) circuitry, digital-to-analog (D/A) circuitry, signal conditioning devices and/or buffering electronics; and the network communication circuitry 50 may include one or more network interface cards, controllers, and/or wireless transmitters.

The software 42 may run on/through the computing hardware 40, and may include a hypervisor 30 at its most base level, which may apportion the use of the computing hardware 40 to the various virtual machines 31, 32. The manner of the apportionment may be controlled by a configuration file 52 provided with the hypervisor 30. For example, the configuration file 52 may specify that the computing hardware 40 be apportioned according to a time-division scheme, a priority-scheme, or a fixed mapping scheme.

A time-division apportionment scheme may specify that, for example, over a 10 ms time window, virtual machine 31 be allotted 6 ms of processing time (from digital processing device 44) and virtual machine 32 be allotted 4 ms. In a priority-based apportionment scheme, processor usage (or access to other computing resources) may be dictated according to a fixed priority schedule, which may roughly reflect the criticality of the tasks being performed by the various virtual machines 31, 32. Finally, in a fixed-mapping, or other mapping-based apportionment scheme, certain resources (e.g., memory or communication channels) may be statically dedicated to only a particular virtual machine. Using any of these schemes, the computing hardware 40 may be virtualized for each virtual machine 31, 32 as an independent set of virtual computing hardware 54, 56.

In a hardware-virtualized environment, each virtual machine 31, 32 defined within the software 42 may include its own independent operating system 58, 59 and application software 60, 62 that may perform the machine's respective software functions. In an embodiment, an operating system 58 for a particular virtual machine may be omitted if the application software is embedded and/or configured to directly interface with the computing hardware 40 (via the virtual computing hardware). As may be appreciated, the application software 60, 62 may embody one or more application-level programs that may perform control, monitoring, and/or data-logging functions. In an automobile context, examples of specific applications may include steering control, speed sensing/control, throttle control, braking control, engine diagnostics management, coolant temperature monitoring, transmission management, windshield wiper control, and/or control of other ancillary systems.

Referring again to FIG. 1, as mentioned above, one of the computing devices 20 may be configured as a supervisor node 25, and may be in communication with each of the various processing nodes 21, 22, 23 over a data network 24. Similar to the processing nodes 21 described with respect to FIG. 2, the supervisor node 25 may include both computing hardware and application software that may run on/through the hardware. In an embodiment, the application software operating on the supervisor node 25 may include a reconfiguration manager 70, which may be configured to monitor the operational status of each processor node 21, 22, 23, and reassign one or more virtual machines to other computing devices in the event of a hardware failure or other un-recoverable fault. In this manner, the reconfiguration manager 70 may dynamically create a system redundancy, allowing critical systems/ applications to continue operating, even in the event of a partial or total hardware failure of a given computing device 20.

The operation of the reconfiguration manager 70 is schematically illustrated in FIG. 3 and described with respect to the method 80 of FIG. 4. As generally shown in the hypothetical scenario provided in FIG. 3, a fault has occurred on processing node 23, which has rendered the node 23 temporarily or permanently inoperable. Due to the inoperability of the node 23, any applications operating on virtual machines 35, 36 have been suspended or frozen. The reconfiguration manager 70 may begin by detecting the existence of the fault condition on this node 23 at step 90. The fault detection of step 90 may occur, for example, through the reception of fault codes, such as may be generated by a fault detection circuit/routine directly on the node 23 (e.g., a watchdog circuit), or may occur through a timeout or failure of the node 23 to acknowledge a request, or through an analysis of the node's performance (i.e., by comparing actual data/behavior to expected data/behavior), or through some other fault detection means.

Once the reconfiguration manager 70 has detected a fault at step 90, it may identify which software functions or specific application software may be impacted by the fault at step 92. This identification may be performed by first identifying the nature of the fault, then identifying the hardware and/or software that may be implicated and/or compromised by the fault, and finally, by identifying any application software that may be reliant on the implicated hardware and/or software.

After the affected application software is identified in step 92, the software functions performed by the affected software (e.g., control, monitoring, and/or data-logging functions) may be evaluated in step 94 to identify their level of criticality, and correspondingly, their need to be reassigned to another computing node. In an embodiment, each software function may be pre-assigned a criticality level or a relative importance to the overall system. These pre-assigned levels may be stored in a memory device or database 96 associated with the supervisor node 25, and may be readily accessible in the event of a fault. If a software function is deemed "critical" or "important" (i.e., if the virtual machine being assessed as being above a threshold level of criticality), the reconfiguration manager 70 may flag the virtual machine performing that software function for reassignment to another computing device. In an automotive context, the criticality or importance levels may be based on functional safety considerations, such as those specified in IEC 61508 or ISO 26262-9:2011. For example, ISO 26262-9:2011 defines four Automotive Safety Integrity Levels that categorize functional safety according to the potential exposure/frequency of the situation, the controllability of the system 12 in the absence of the specific function, and severity or impact of possible damage.

Once a virtual machine is flagged for reassignment to another computing device in step 94, the reconfiguration manager 70 must then determine which remaining processing node is most appropriate to receive the virtual machine. For example, the reconfiguration manager 70 may first examine the system to determine whether any of the processing nodes have available processing capacity or unallocated memory. If no space exists, the reconfiguration manager 70 may then identify a virtual machine on a functioning node that has a lower criticality or importance than the virtual machine to be reassigned. The reconfiguration manager 70 may then decide whether to reduce or eliminate the allocation of hardware resources to the lesser-critical virtual machine to accommodate the reassigned virtual machine. Said another way, in step 98, the reconfiguration manager 70 may analyze the entire system, and decide how best to allocate the available, functioning hardware resources to the most critical, or highest priority virtual machines. In an embodiment, the allocation/assessment of available resources may be made in view of a system hardware allocation database 100 that is stored in memory associated with the supervisor node 25, and accessible by the reconfiguration manager 70. This database 100 may provide an easily accessible listing of all hardware within the system architecture, and how the hardware is currently being apportioned between the various virtual machines.

Once the critical functions needing reassignment are identified in step 94, and the available, functioning hardware resources are identified and assessed in step 98, the reconfiguration manager 70 may generate new/modified hypervisor configuration files 152 for one or more computing devices in step 102, and may transmit them to the devices in step 104. The new configuration files 152 may be subject to predefined constraints, such as the availability of I/O channels, communication channels, or processing threads, which may be specified in a memory 106 associated with the reconfiguration manager 70.

Referring again to FIG. 3, and similar to FIG. 1, the architecture 10 may include three processing nodes 21, 22, 23. Processing node 21 may initially host virtual machines 31 and 32, processing node 22 may host virtual machines 33 and 34, and processing node 23 may host virtual machines 35 and 36. A reconfiguration manager 70 may operate on a supervisor node 25, and may be in communication with the processing nodes 21, 22, 23 over a data network 24.

In an embodiment, the reconfiguration manager 70 may detect a fault on node 23, and then assess the criticality of the software functions performed by the now non-operative virtual machines 35 and 36. In an example where virtual machine 35 is deemed "critical" and necessary to be reassigned, the reconfiguration manager 70 may then determine the most appropriate functioning node (e.g., nodes 21, 22) to host a new virtual machine 135 (which may be a copy or pared down version of virtual machine 35). After an assessment of the available hardware resources of functional nodes 21, 22, the reconfiguration manager 70 may reassign virtual machine 35 to node 21 by providing the respective hypervisor 30 with a new configuration file 152. The new configuration file 152 may apportion computing hardware resources to the new virtual machine 135 by, for example, reducing the respective apportionments to virtual machines 31 and 32, or by completely eliminating the apportionment to the lowest priority virtual machine (e.g., virtual machine 32).

FIGS. 5 and 6 illustrate one potential embodiment of a reallocation scheme that may be implemented through a new/modified hypervisor configuration file 152. FIG. 5 generally illustrates two processing time allocation diagrams 200, 202, such as for the digital processing device 44, where diagram 200 represents an initial processor allocation and diagram 202 illustrates a reconfigured allocation. Each diagram 200, 202 is represented over a fixed amount of time 210. In the first diagram 200, virtual machine 31 is provided a first amount of processing time 231, and virtual machine 32 is provided the remainder of the processing time 232. Virtual machine 135, however, is not provided any time 235 (or a negligible amount of time). Following the processor reallocation (i.e., receipt of the new configuration file 152), processing time 231 for virtual machine 31 may remain unchanged, however, processing time 232 for virtual machine 32 may be reduced and effectively substituted by the allocation of processing time 235 to virtual machine 135.

FIG. 6 generally illustrates two memory allocation maps 300, 302 that respectively represent pre- and post-reallocations. As shown, prior to the computing device 20 receiving a new configuration file 152, the first map 300 provides a roughly equal allocation of memory 331, 332 between respective virtual machines 31 and 32. Following the reallocation, the memory may be allocated according to a second map 302, which reassigns memory block 332 (from the first map 300) to virtual machine 135 (as memory block 335).

Figure 7:
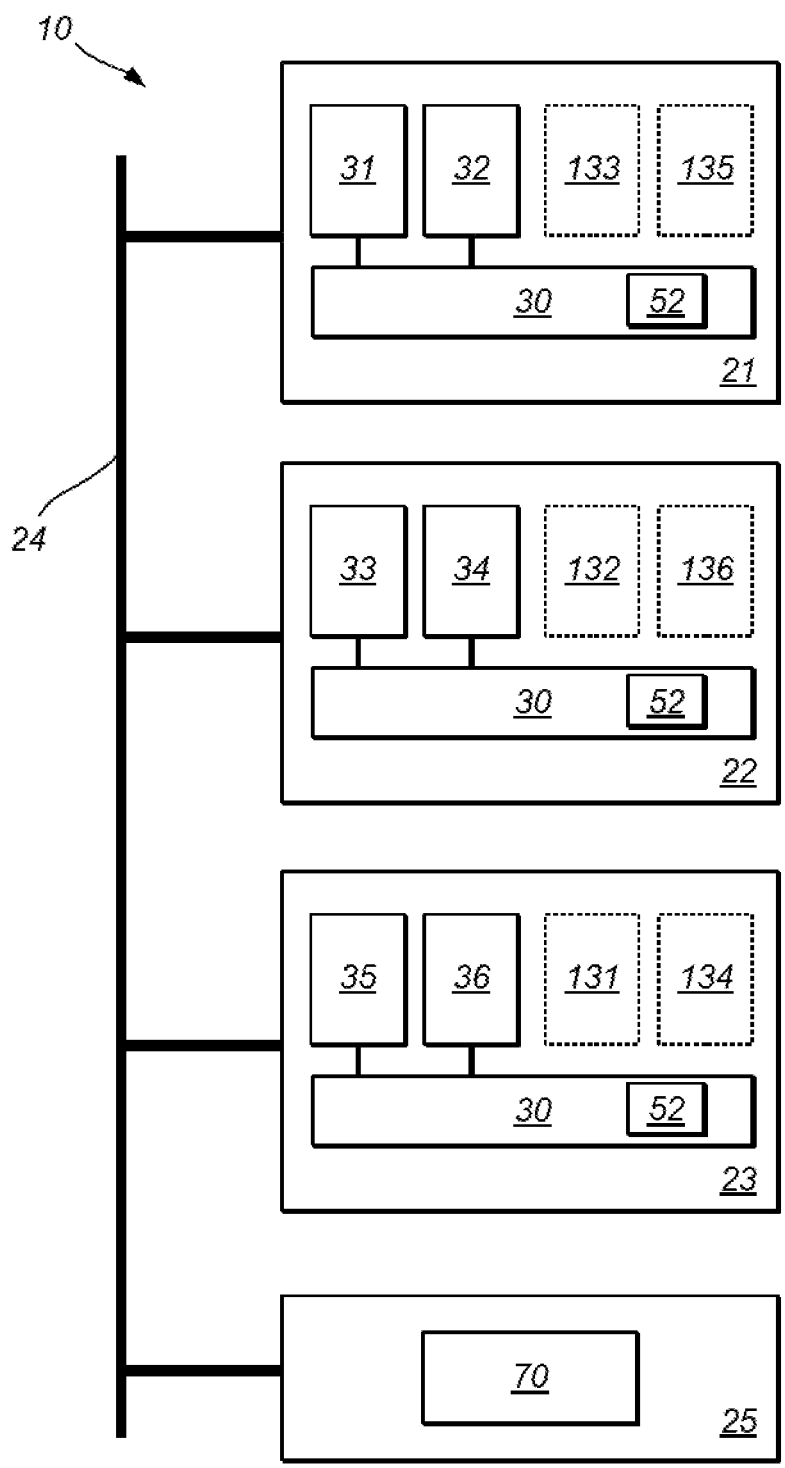
FIG. 7 is a schematic illustration of a distributed computing architecture that includes a plurality of distinct computing devices, with processing nodes having a plurality of dormant virtual machines stored therein.

While the preceding description deals primarily with creating a virtual machine redundancy by updating a hypervisor configuration file 52 with a new hypervisor configuration file 152 (i.e., to reapportion the use of the existing hardware resources), it does not specifically address where the new virtual machine 135 comes from. As may be appreciated, and described with respect to FIG. 2, the virtual machine may include both compiled application software and an operating system. This software may preferably be located local to the respective processing node prior to being allocated a share of the hardware resources. Therefore, in an embodiment such as schematically illustrated in FIG. 7, dormant copies of one or more other virtual machines may be included on each computing device. This configuration may provide for a rapid reconfiguration speed by eliminating a need to transfer the virtual machine, itself, over the communication network 24. For example, processing node 21 may include dormant virtual machines 133 and 135, which may be copies of virtual machines 33 and 35 respectively. Likewise processing node 22 may include dormant virtual machines 132 and 136 (copies of virtual machines 32 and 36 respectively) and processing node 23 may include dormant virtual machines 131 and 134 (copies of virtual machines 31 and 34 respectively). A dormant copy may, for example, be a virtual machine that exists within the software 42 in a compiled and operational, or near-operational state. It may, however, be regarded as "dormant" because it may be allocated no processing time, no memory, no I/O access and/or no communication channels by the hypervisor 30, thereby placing it in a suspended/dormant state.

Upon receipt of the new/modified configuration file 152, the hypervisor 30 may activate, or breathe life into the previously dormant virtual machine by allotting it a share of the computing hardware resources 40. In an embodiment, the new/modified configuration file 152 may merely be a modification of the pre-existing configuration file 52 that acts to reapportion the various physical hardware resources. By including one or more redundant virtual machines in a dormant state, a reconfiguration may be rapidly executed at the time of fault detection without the need to compile or transfer new software to the processing node.

In an embodiment, a redundant copy of each virtual machine 31-36 may be located in a dormant state somewhere within the architecture 10 on at least one other processing node (such as generally illustrated in FIG. 7). In another embodiment, each node may include a full copy of every virtual machine within the system. The locations of the preloaded, redundant copies of the various virtual machines may be applied as a constraint on the reassignment of a critical virtual machine.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of dynamically reconfiguring a distributed computing architecture having a first and a second processing node, each processing node including a respective hypervisor configured to apportion processing resources of the respective processing node between a plurality of virtual machines at the direction of a hypervisor configuration file, the method comprising:
    apportioning processing resources on the first processing node between a first virtual machine and a second virtual machine at the direction of a first hypervisor configuration file;
    detecting a fault condition on a second processing node, the second processing node including a third virtual machine;
    assessing the criticality of a software function performed by the third virtual machine; and
    reassigning the third virtual machine to the first processing node if the third virtual machine is assessed as being above a threshold level of criticality, wherein reassigning the third virtual machine includes:
        providing a second hypervisor configuration file to the first processing node;
        apportioning processing resources on the first processing node to a fourth virtual machine at the direction of the second hypervisor configuration file; and
        wherein the fourth virtual machine is a copy of a portion of the third virtual machine.

2. The method of claim 1, wherein the fourth virtual machine exists on the first processing node prior to the detection of the fault; and
    wherein no processing resources are apportioned to the fourth virtual machine prior to apportioning at the direction of the second hypervisor configuration file.

3. The method of claim 2, wherein processing resources includes a processing allocation and a memory allocation.

4. The method of claim 2, wherein the second hypervisor configuration file directs the hypervisor on the first processing node to reduce an apportionment of processing resources to at least one of the first and the second virtual machines.

5. The method of claim 3, wherein processing resources are apportioned according to a time-division scheme, a priority scheme, or a fixed mapping scheme.

6. The method of claim 1, wherein each of the plurality of processing nodes are distinct computing devices, each computing device including physical computing hardware and software.

7. The method of claim 1, wherein assessing the criticality of a software function includes categorizing the software functions according to automotive software integrity levels specified in ISO 26262-9:2011.

8. A distributed computing architecture with dynamically reconfigurable processing nodes, the architecture comprising:
    a supervisor node including physical computing hardware and executable software;
    a first processing node and a second processing node in communication with the supervisor node over a data network, each of the first and second processing nodes respectively including physical computing hardware, a hypervisor, and a plurality of virtual machines, the hypervisor being configured to apportion use of the physical computing hardware to the plurality of virtual machines according to a hypervisor configuration file; and
    a reconfiguration manager operating on the supervisor node and configured to:

detect a fault condition on the first processing node;
assess the criticality of a software function performed by each of the respective virtual machines on the first processing node; and
reassign at least one first virtual machine of the plurality of virtual machines on the first processing node to the second processing node if the at least one first virtual machine is assessed as being above a threshold level of criticality, wherein reassigning the at least one first virtual machine includes:
providing a second hypervisor configuration file to the first processing node;
apportioning processing resources on the first processing node to a second virtual machine of the plurality of virtual machines at the direction of the second hypervisor configuration file; and
wherein the second virtual machine is a copy of a portion of the first virtual machine.

9. The architecture of claim 8, wherein the second hypervisor configuration file directs the hypervisor on the second processing node to reduce an apportionment of the physical computing hardware to at least one of the plurality of virtual machines.

10. The architecture of claim 8, wherein the physical computing hardware is apportioned to the plurality of virtual machines on a processing node according to a time-division scheme, a priority scheme, or a fixed mapping scheme.

11. The architecture of claim 8, wherein the reconfiguration manager is configured to assess the criticality of a software function by categorizing the software functions according to automotive software integrity levels specified in ISO 26262-9:2011.

12. The architecture of claim 8, wherein at least one of the plurality of virtual machines on each of the respective first and second processing nodes is in a dormant state.

13. A method of dynamically reconfiguring a distributed computing architecture having a first and a second processing node, each processing node including a respective hypervisor configured to apportion processing resources of the respective processing node between a plurality of virtual machines at the direction of a hypervisor configuration file, the method comprising:
apportioning processing resources on the first processing node between a first virtual machine and a second virtual machine at the direction of a first hypervisor configuration file;
detecting a fault condition on a second processing node, the second processing node including a third virtual machine;
assessing the criticality of a software function performed by the third virtual machine;
reassigning the third virtual machine to the first processing node if the third virtual machine is assessed as being above a threshold level of criticality, wherein reassigning the third virtual machine includes:
providing a second hypervisor configuration file to the first processing node;
apportioning processing resources on the first processing node to a fourth virtual machine at the direction of the second hypervisor configuration file; and
wherein the fourth virtual machine is a copy of a portion of the third virtual machine; and
reducing an apportionment of processing resources to at least one of the first and the second virtual machines.

14. The method of claim 13, wherein the fourth virtual machine exists on the first processing node prior to the detection of the fault; and
wherein no processing resources are apportioned to the fourth virtual machine prior to apportioning at the direction of the second hypervisor configuration file.

15. The method of claim 13, wherein providing a second hypervisor configuration file to the first processing node includes: generating the second hypervisor configuration file; and
storing the second hypervisor configuration file locally on the first processing node.

* * * * *